(No Model.) 2 Sheets—Sheet 1.
H. McCURRY.
VEHICLE SEAT TOP.
No. 426,302. Patented Apr. 22, 1890.
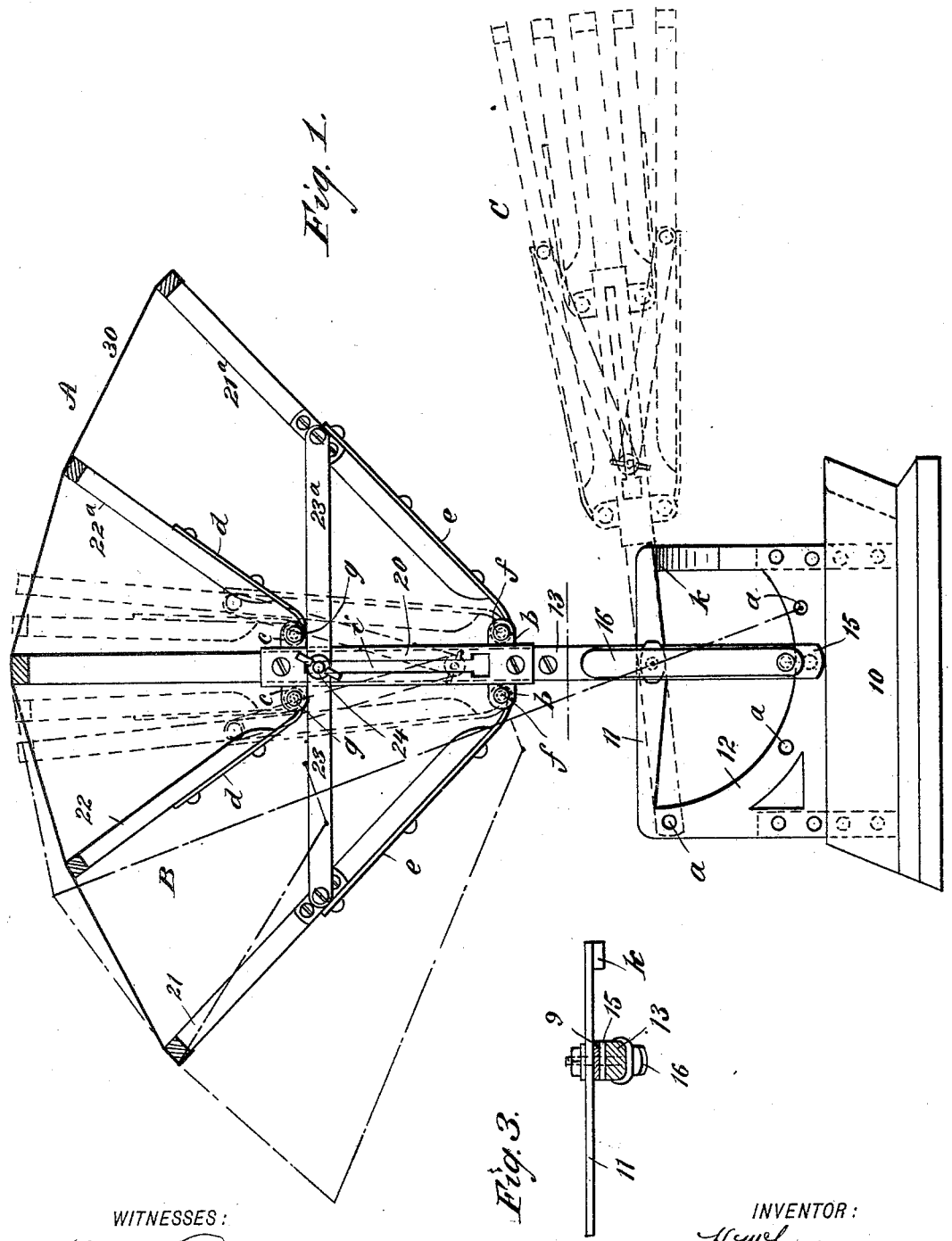
WITNESSES:
Donn Piritchell
C. Sedgwick
INVENTOR:
H. McCurry
BY
Munn & Co.
ATTORNEYS.

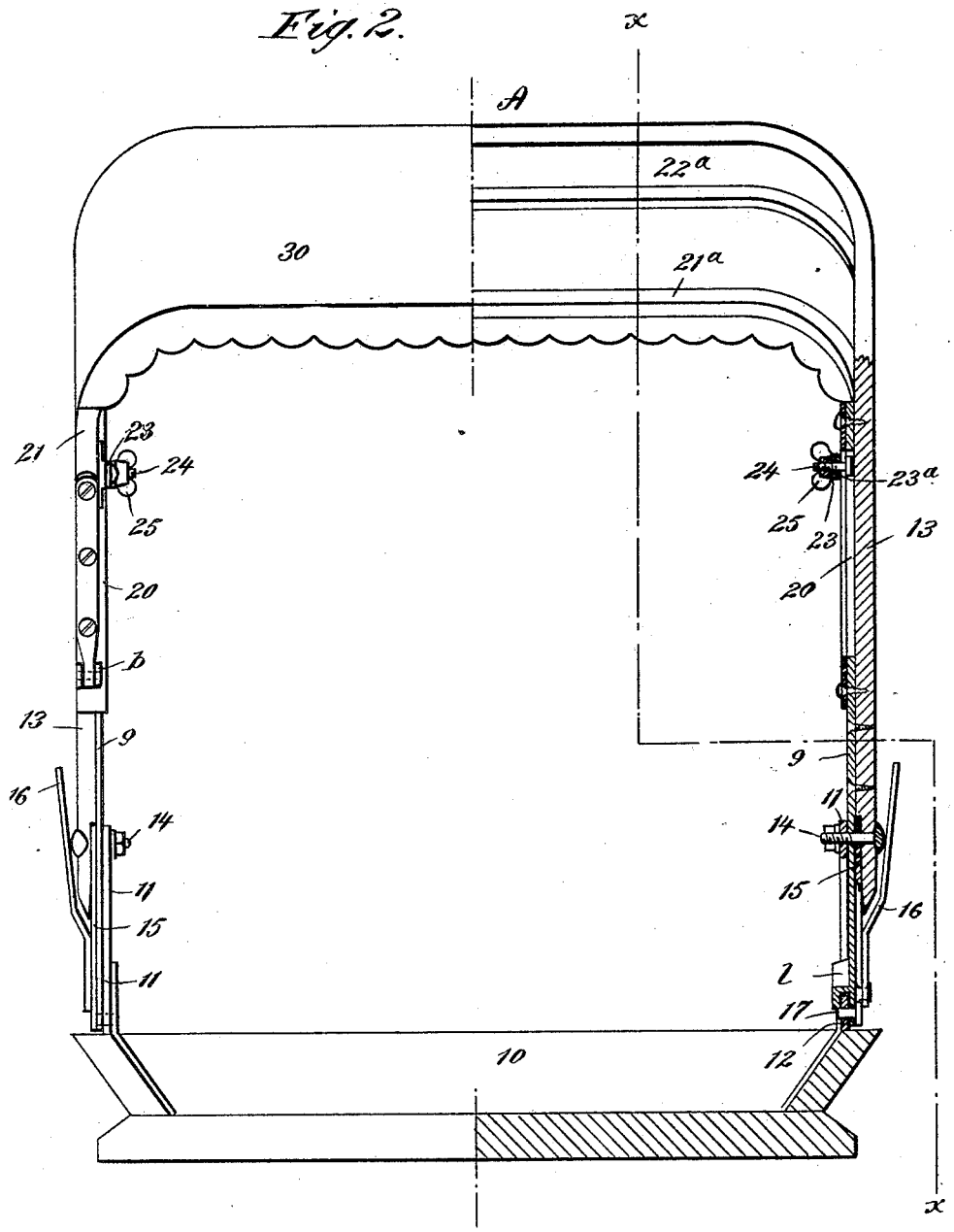

UNITED STATES PATENT OFFICE.

HENRY McCURRY, OF CHICAGO, ILLINOIS.

VEHICLE-SEAT TOP.

SPECIFICATION forming part of Letters Patent No. 426,302, dated April 22, 1890.

Application filed November 11, 1889. Serial No. 329,895. (No model.)

*To all whom it may concern:*

Be it known that I, HENRY McCURRY, of Chicago, in the county of Cook and State of Illinois, have invented a new and Improved Folding and Shifting Vehicle-Seat Top, of which the following is a full, clear, and exact description.

This invention relates to vehicle-seat tops, the object of the invention being to provide a top which shall be so constructed that the bows may be folded so as to occupy a minimum amount of space; and, further, to provide a top which may be tilted forward or backward as circumstances may require.

To the ends named the invention consists of certain novel constructions, arrangements, and combinations of parts, which will be hereinafter fully explained, and specifically pointed out in the claims.

Reference is to be had to the accompanying drawings, forming a part of this specification, in which similar figures and letters of reference indicate corresponding parts in all the views.

Figure 1 is a sectional elevation of a vehicle seat and top embodying my invention, the view being taken on the broken line $x\,x$ of Fig. 2. Fig. 2 is a front view of the seat and top in partial section upon the right, and Fig. 3 is a plan view of one of the seat-standards and a portion of the main bow.

In the drawings, 10 represents a wagon-seat, to the sides of which there are secured frames or standards 11, having segmental bars 12, that are formed with a number of apertures $a$. To the upper cross-bars of the frames or standards I pivotally connect the lower ends of the main bow 13 of the top A. Upon the bolts or pins 14, by which the bow 13 is connected to the frames 11, there are mounted springs 15, and to these springs there are rigidly secured upwardly-extending handles 16 and catch-pins 17, such catch-pins being arranged to enter the apertures $a$ of the segmental bars 12, thus providing for the holding of the bow and the parts carried thereby in a vertical position, as shown in full lines in Fig. 1, or in an inclined position, as shown by the dotted lines B in said figure, or in the position indicated by the dotted lines C in Fig. 1, or in such intermediate position as may be desired.

In order that the bow 13 may be steadied when it is shifted, as above described, I secure to the side lengths thereof irons 9, having bifurcated lower ends, the members of the bifurcated ends overlapping the segmental bars 12. To each side length of the bow 13, I secure a housing 20, that is formed with lugs or ears $b\,b$ and $c\,c$, such lugs or ears serving as supports for auxiliary bows 21 and $21^a$ 22 and $22^a$, as many sets of bows being employed as may be deemed advisable, the connection between the bow-irons $e$ and $d$ and the lugs or ears $b$ and $c$ being established by means of pivot pins or bolts $f\,f$ and $g\,g$. To the side lengths of the bows 21 and $21^a$, I pivotally connect links 23 and $23^a$, the inner ends of said links being apertured to provide for the passage of the shanks of bolts 24, the heads of said bolts resting between the side lengths of the bow 13 and the housings 20, the bolt-shank extending outward through a slot $i$, formed in said housings, while the extending ends of the bolts are engaged by winged nuts 25, the arrangement being such that by turning home the nuts the bows may be held extended, as represented in full lines in Fig. 1, or by loosening the nuts and adjusting the bows, as represented in dotted lines in said figure, and then again turning home the nuts the bows may be held in the folded position, as indicated by said dotted lines. Upon the main and auxiliary bows I stretch a covering 30 of any proper material.

From the foregoing description it will be seen that the top may be adjusted forward or backward, so as to shield the driver from rain or sun, and it will also be seen that the bows may be folded and moved to a position such that they will not interfere with the loading of the vehicle.

In order that the pins 17 may be relieved from all undue strain, I prefer to form the frames or standards 11 with shoulders $k$ and to form the main bow-extensions 9, with shoulders $l$.

Having thus described my invention, I claim as new and desire to secure by Letters Patent—

1. In a shifting and folding top, the combination, with frames arranged in connection with a vehicle-seat, of the main bows 13, pivoted to the frames, means for locking the said bows in position, the housings 20, secured to the bows and provided with the ears $b$ $c$ and slots $i$, the auxiliary bows 21 21ª 22 22ª, pivoted to the ears $b$ $c$ of the housing, the links 23 23ª, having their outer ends pivoted to the bows 21 21ª, the bolts 24, for securing the inner ends of the links to the housing, and nuts 25 on the said bolts, substantially as herein shown and described.

2. In a shifting and folding top, the combination, with frames or standards arranged for connection with a vehicle-seat, said frames or standards being formed with apertured segmental bars 12, of a main bow pivotally connected to the frames or standards, bifurcated extensions carried by said bow, such extensions engaging the segmental bars, catch-carrying springs, also carried by the bow, rigidly-connected handles which extend upward from the springs, folding auxiliary bows carried by the main bow, links carried by the lower set of auxiliary bows, and a means for clamping such links, substantially as described.

HENRY McCURRY.

Witnesses:
THOS. C. LALLY,
THOS. A. McMAHON.